(12) United States Patent
Sasaki

(10) Patent No.: US 9,973,109 B2
(45) Date of Patent: May 15, 2018

(54) INVERTER CIRCUIT WITH CURRENT DETECTION CIRCUITRY

(71) Applicant: Fuji Electric Co., Ltd., Kanagawa (JP)

(72) Inventor: Masahiro Sasaki, Nagano (JP)

(73) Assignee: FUJI ELECTRIC CO., LTD., Kanagawa (JP)

( * ) Notice: Subject to any disclaimer, the term of this patent is extended or adjusted under 35 U.S.C. 154(b) by 0 days. days.

(21) Appl. No.: 15/402,591

(22) Filed: Jan. 10, 2017

(65) Prior Publication Data

US 2017/0237362 A1 Aug. 17, 2017

(30) Foreign Application Priority Data

Feb. 16, 2016 (JP) .................................. 2016-026914

(51) Int. Cl.
*H02H 7/122* (2006.01)
*H02M 7/5387* (2007.01)
*H02M 1/08* (2006.01)
*H02M 1/32* (2007.01)

(52) U.S. Cl.
CPC ........... *H02M 7/5387* (2013.01); *H02M 1/08* (2013.01); *H02M 1/32* (2013.01)

(58) Field of Classification Search
CPC .... H02M 1/4266; H02M 7/5395; H02M 1/12; H02M 1/14; H02M 1/32; H02M 7/5387; H02M 7/53871; H02M 3/3155; H02M 3/325; H02M 3/335; H02M 7/537; H02M 7/5383; H02H 7/122; H02H 7/1222; H02H 7/1227

USPC ............ 363/40, 41, 55, 56.01, 56.02, 56.03, 363/56.04, 56.05, 131–132
See application file for complete search history.

(56) References Cited

U.S. PATENT DOCUMENTS

| 8,644,038 | B2 | 2/2014 | Sasaki | |
|---|---|---|---|---|
| 2011/0299311 | A1* | 12/2011 | Zhu | H02M 1/126 363/132 |
| 2013/0039100 | A1* | 2/2013 | Kazama | H03K 17/164 363/41 |
| 2013/0301327 | A1* | 11/2013 | Wagoner | H02M 1/126 363/132 |

FOREIGN PATENT DOCUMENTS

| JP | 2012-85131 A | 4/2012 |
|---|---|---|
| JP | 2012-90499 A | 5/2012 |

* cited by examiner

*Primary Examiner* — Nguyen Tran
(74) *Attorney, Agent, or Firm* — Chen Yoshimura LLP

(57) ABSTRACT

An inverter circuit with a current detection circuitry includes a main bridge circuit connected between the pair of DC input nodes, the main bridge circuit converting the received DC voltage to a primary AC current so as to output the primary AC current through an output terminal to be connected to a load; a supplementary bridge circuit connected in parallel to the main bridge circuit between the pair of DC input nodes, the supplementary bridge circuit having a circuit configuration identical to that of the main bridge circuit with smaller circuit parameters in at least some of constituent circuit elements so as to generate a detection-use AC current that is a prescribed fraction of said AC current outputted by the main bridge circuit. The detection-use AC current is detected by a current detector so as to calculate the amount of the primary AC current.

6 Claims, 8 Drawing Sheets

INVERTER CIRCUIT WITH CURRENT DETECTION CIRCUITRY

BACKGROUND OF THE INVENTION

Technical Field

The present technique relates to a current detection device and a semiconductor device.

Background Art

Recent years have seen the continued development of semiconductor devices known as Insulated Gate Bipolar Transistors (IGBTs), and Intelligent Power Modules (IPMs) containing driver circuits for driving IGBTs.

An IPM is a power semiconductor module for power switching, and supplies power to powered electronic products such as motors, robots, inverters, and converters. An IPM also detects current flowing in a semiconductor element and protects the semiconductor element on the basis of the detected current information.

As a conventional current detection technique, a technique has been proposed in which the direction of an output current flowing in a power semiconductor device equipped with a sense function is detected and outputted to a CPU. Then, a gain amount, offset amount, and the like of current detection properties are adjusted by a setting signal outputted from the CPU in accordance with the direction of the output current (Patent Document 1).

RELATED ART DOCUMENT

Patent Document

Patent Document 1: Japanese Patent Application Laid-Open Publication No. 2012-90499

SUMMARY OF THE INVENTION

A typical configuration for current detection has a current detection unit provided on the main line of the IPM or on a bus bar provided in the main line, such that a load current is detected.

However, according to such a configuration, the current detection unit detects a main current, which is a large current flowing in the main line, as the load current. If a current transformer, for example, is accordingly used as the current detection unit, the size of the unit will increase. This leads to a problem in that the scale of the device will increase as well.

Having been achieved in light of such circumstances, it is an object of the present invention to provide a current detection device and a semiconductor device that achieve a reduction in the scales of the devices. Accordingly, the present invention is directed to a scheme that substantially obviates one or more of the problems due to limitations and disadvantages of the related art.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, the present disclosure provides an inverter circuit having a current detection circuitry, including: a pair of DC input nodes configured to receive a DC voltage: a main bridge circuit connected between the pair of DC input nodes, the main bridge circuit converting the received DC voltage to a primary AC current so as to output the primary AC current through an output terminal to be connected to a load; a supplementary bridge circuit connected in parallel to the main bridge circuit between the pair of DC input nodes for calculating an amount of the AC current outputted by the main bridge circuit, the supplementary bridge circuit having a circuit configuration identical to that of the main bridge circuit with smaller circuit parameters in at least some of constituent circuit elements so as to generate a detection-use AC current that is a prescribed fraction of said AC current outputted by the main bridge circuit, an output line of the supplementary bridge circuit carrying the detection-use AC current being connected to the output terminal of the main bridge circuit to supplement the primary AC current; and a current detector disposed on said output line of the supplementary bridge circuit to detect the detection-use AC current and output a signal corresponding to the detected detection-use AC current that is said prescribed fraction of the primary AC current from the main bridge circuit.

In another aspect, the present disclosure provides a three-phase semiconductor inverter circuit having a current detection circuitry, including: a pair of DC input nodes configured to receive a DC voltage; a U-phase main bridge circuit connected between the pair of DC input nodes, the U-phase main bridge circuit converting the received DC voltage to a primary U-phase AC current so as to output the primary U-phase AC current through a U-phase output terminal to be connected to a load; a U-phase supplementary bridge circuit connected in parallel to the U-phase main bridge circuit between the pair of DC input nodes for calculating an amount of the U-phase AC current outputted by the U-phase main bridge circuit, the U-phase supplementary bridge circuit having a circuit configuration identical to that of the U-phase main bridge circuit with smaller circuit parameters in at least some of constituent circuit elements so as to generate a detection-use U-phase AC current that is a prescribed fraction of said U-phase AC current outputted by the U-phase main bridge circuit, an output line of the U-phase supplementary bridge circuit carrying the detection-use U-phase AC current being connected to the U-phase output terminal of the U-phase main bridge circuit to supplement the primary U-phase AC current; a U-phase current detector disposed on said U-phase output line of the U-phase supplementary bridge circuit to detect the detection-use U-phase AC current and output a U-phase signal corresponding to the detected detection-use U-phase AC current that is said prescribed fraction of the primary U-phase AC current from the main bridge circuit; a V-phase main bridge circuit connected between the pair of DC input nodes, the V-phase main bridge circuit converting the received DC voltage to a primary V-phase AC current so as to output the primary V-phase AC current through a V-phase output terminal to be connected to the load; a V-phase supplementary bridge circuit connected in parallel to the V-phase main bridge circuit between the pair of DC input nodes for calculating an amount of the V-phase AC current outputted by the V-phase main bridge circuit, the V-phase supplementary bridge circuit having a circuit configuration identical to that of the V-phase main bridge circuit with smaller circuit parameters in at least some of constituent circuit elements so as to generate a detection-use V-phase AC current that is a prescribed fraction of said V-phase AC current outputted by the V-phase main bridge circuit, an output line of the V-phase supplementary bridge circuit carrying the detection-use V-phase AC current being connected to the V-phase output terminal of the V-phase main bridge circuit to supplement the primary V-phase AC current; a V-phase current detector disposed on said V-phase output line of the V-phase supplementary bridge circuit to detect the detection-use V-phase AC current and output a V-phase signal corresponding to the detected detection-use V-phase AC current that is said prescribed fraction of the primary V-phase AC current from the main bridge circuit; a W-phase main bridge circuit connected between the pair of DC input nodes, the W-phase main bridge circuit converting the received DC voltage to a primary W-phase AC current so as to output the primary W-phase AC current through a W-phase output terminal to be connected to the load; a W-phase supplementary bridge circuit connected in parallel to the W-phase main bridge circuit between the pair of DC input nodes for calculating an amount of the W-phase AC current outputted by the W-phase main bridge circuit, the W-phase supplementary bridge circuit having a circuit configuration identical to that of the W-phase main bridge circuit with smaller circuit parameters in at least some of constituent circuit elements so as to generate a detection-use W-phase AC current that is a prescribed fraction of said W-phase AC current outputted by the W-phase main bridge circuit, an output line of the W-phase supplementary bridge circuit carrying the detection-use W-phase AC current being connected to the W-phase output terminal of the W-phase main bridge circuit to supplement the primary W-phase AC current; and a W-phase current detector disposed on said W-phase output line of the W-phase supplementary bridge circuit to detect the detection-use W-phase AC current and output a W-phase signal corresponding to the detected detection-use W-phase AC current that is said prescribed fraction of the primary W-phase AC current from the main bridge circuit.

The U-phase bridge circuit includes a U-phase main bridge circuit that outputs a first U-phase current through a first U-phase output line connected to a load, and a U-phase current detection bridge circuit that is connected in parallel to the U-phase main bridge circuit and that outputs a second U-phase current through a second U-phase output line connected at one end to the first U-phase output line.

The V-phase bridge circuit includes a V-phase main bridge circuit that outputs a first V-phase current through a first V-phase output line connected to the load, and a V-phase current detection bridge circuit that is connected in parallel to the V-phase main bridge circuit and that outputs a second V-phase current through a second V-phase output line connected at one end to the first V-phase output line.

The W-phase bridge circuit includes a W-phase main bridge circuit that outputs a first W-phase current through a first W-phase output line connected to the load, and a W-phase current detection bridge circuit that is connected in parallel to the W-phase main bridge circuit and that outputs a second W-phase current through a second W-phase output line connected at one end to the first W-phase output line.

The U-phase current detection unit is disposed in the second U-phase output line and detects the second U-phase current. The V-phase current detection unit is disposed in the second V-phase output line and detects the second V-phase current. The W-phase current detection unit is disposed in the second W-phase output line and detects the second W-phase current.

The present invention makes it possible to reduce the scale of a device. It is to be understood that both the foregoing general description and the following detailed description are exemplary and explanatory, and are intended to provide further explanation of the invention as claimed.

DETAILED DESCRIPTION OF EMBODIMENTS

Embodiments will be described hereinafter with reference to the drawings.

Figure 1:
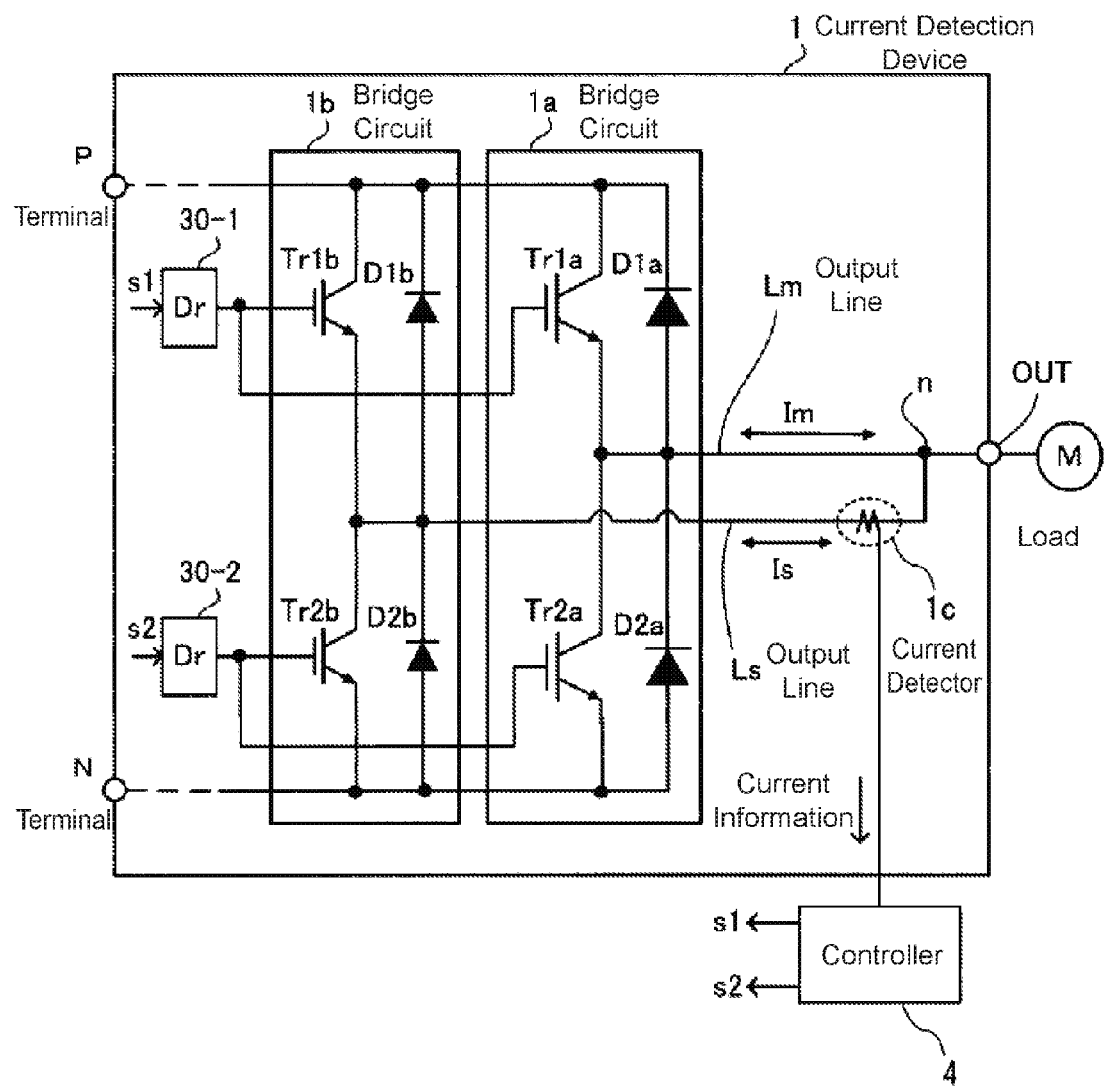
FIG. 1 is a diagram illustrating an example of the configuration of a current detection device.

FIG. 1 is a diagram illustrating an example of the configuration of a current detection device (i.e., an inverter circuit having a current detection circuitry). A current detection device 1 includes a bridge circuit 1a (a first bridge circuit or main bridge circuit), a bridge circuit 1b (a second bridge circuit or supplementary bridge circuit), a current detection unit 1c (current detector), and driver circuits 30-1 and 30-2.

The bridge circuit 1a is a main bridge circuit that supplies current to a load M, and includes transistors Tr1a and Tr2a and diodes D1a and D2a. The bridge circuit 1b is a bridge circuit for detection current in addition to supplying current to the load M, and includes transistors Tr1b and Tr2b and diodes D1b and D2b.

The bridge circuit 1a outputs a current Im (a first current or primary AC current) through an output line Lm (a first output line) connected to the load M. The bridge circuit 1b is connected in parallel to the bridge circuit 1a, and outputs a current Is (a second current or detection-use AC current) through an output line Ls (a second output line) connected at one end to the output line Lm. The current detection unit 1c is disposed in the output line Ls and detects the current Is.

With respect to the connection relationships between the elements, a collector of the transistor Tr1a is connected to a collector of the transistor Tr1b, cathodes of the diodes D1a and D1b, and a P terminal. The P terminal corresponds to a power source terminal, for example.

An emitter of the transistor Tr2a is connected to an emitter of the transistor Tr2b, anodes of the diodes D2a and D2b, and an N terminal. The N terminal corresponds to a GND terminal, for example.

Meanwhile, an emitter of the transistor Tr1a, a collector of the transistor Tr2a, an anode of the diode D1a, and a cathode of the diode D2a are connected to an output terminal OUT through the output line Lm, and the load M is connected to the output terminal OUT.

Furthermore, an emitter of the transistor Tr1b, a collector of the transistor Tr2b, an anode of the diode D1b, and a cathode of the diode D2b are connected to the output line Ls.

One end of the output line Ls is connected to a node n on the output line Lm, and the current detection unit 1c is inserted into the output line Ls.

Bases of the transistors Tr1a and Tr1b are connected to an output terminal of the driver circuit 30-1, and bases of the transistors Tr2a and Tr2b are connected to an output terminal of the driver circuit 30-2.

Here, a current transformer is employed as the current detection unit 1c. The current transformer is inserted onto the output line Ls, and current information of the current Is detected by the current transformer (i.e., a signal corresponding to the detected current Is) is inputted to, for example, a host control unit (controller) 4 (the structure of the current transformer will be described later with reference to FIG. 3).

On the basis of the current information, the control unit 4 generates drive control signals s1 and s2 for controlling switching of the transistors, and sends those signals to the driver circuits 30-1 and 30-2, respectively. The driving of the high-side transistor Tr1a in the bridge circuit 1a and the high-side transistor Tr1b in the bridge circuit 1b is controlled by the same high-side driver circuit 30-1.

Meanwhile, the driving of the low-side transistor Tr2a in the bridge circuit 1a and the low-side transistor Tr2b in the bridge circuit 1b is controlled by the same low-side driver circuit 30-2.

Additionally, a surface area ratio between a first active surface area of first semiconductor devices (the transistors Tr1a and Tr2a and the diodes D1a and D2a) included in the bridge circuit 1a and a second active surface area of second semiconductor devices (the transistors Tr1b and Tr2b and the diodes D1b and D2b) included in the bridge circuit 1b is equal to a current ratio between the current Im and the current Is. Accordingly, the second active surface area is made smaller than the first active surface area and the current Im is made lower than the current Is (correspondence relationships between the surface area ratio and the current ratio will be described later with reference to FIGS. 5 to 7).

Thus the current detection device 1 is configured such that the bridge circuit 1b for detection current, which is constituted of the second semiconductor devices whose current capacities are lower than the first semiconductor devices in the bridge circuit 1a, is connected in parallel to the bridge circuit 1a, and detects the current Is (<the current Im) flowing in the bridge circuit 1b. This makes it possible to reduce the size of the current detection unit 1c that detects the current Is, which in turn makes it possible to reduce the scale of the device.

A conventional current detection configuration and issues therewith to be solved will be described next, before going into detail about the technique according to the present invention. First, the configuration of an IPM that detects current by having a current transformer inserted onto a main line thereof will be described.

Figure 2:
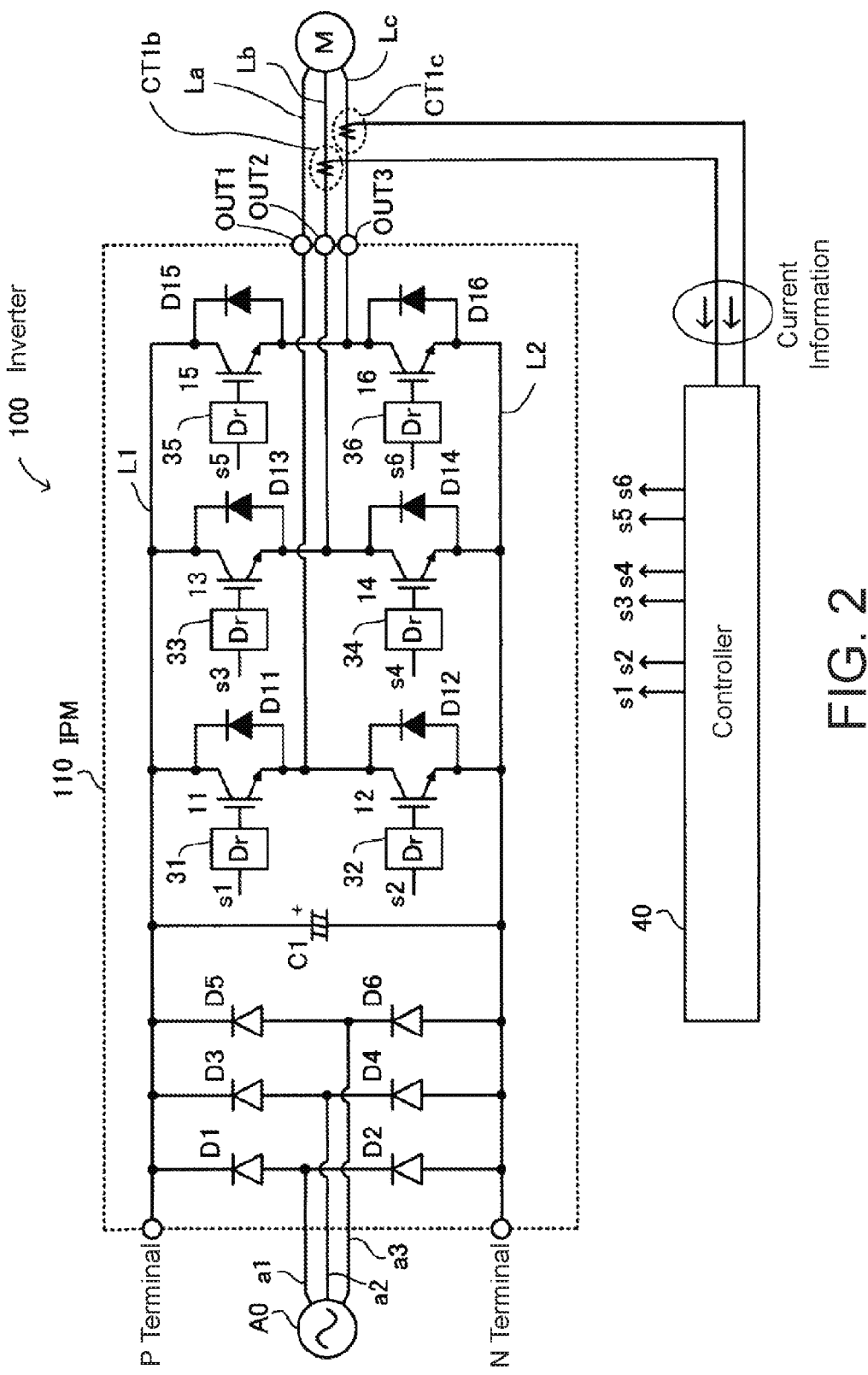
FIG. 2 is a diagram illustrating an example of the configuration of a conventional inverter constituted by an IPM.

FIG. 2 is a diagram illustrating an example of the configuration of a conventional inverter constituted by an IPM. This diagram illustrates a conventional configuration that detects current by having a current transformer inserted into a main line.

An inverter 100 includes an IPM 110 and a host controller 40. The IPM 110 includes diodes D1 to D6 and D11 to D16, a capacitor C1, and IGBTs 11 to 16.

In the IPM 110, the diodes D1 to D6, which form a three-phase rectifying bridge circuit, the smoothing capacitor C1, the IGBTs 11 to 16, which are semiconductor switches, and the diodes D11 to D16 are disposed between a high-voltage bus L1 and a GND bus L2. Driver circuits 31 to 36 for driving the IGBTs 11 to 16, respectively, are connected to the IGBTs 11 to 16, respectively.

A load M is connected to output terminals OUT1 to OUT3 of the IPM 110. The IPM 110 transforms a DC high voltage flowing in the bus L1 into three-phase alternating current and supplies power to the load M from AC main lines La, Lb, and Lc.

The IPM 110 drives the load M by switching a current of an inductive load such as a motor on and off, and thus the diodes D11 to D16, which are freewheeling diodes (FWDs), are connected to the IGBTs 11 to 16 in order to return the load current.

In other words, counter EMF is produced from the inductive load such as a motor the instant the IGBTs 11 to 16 turn off, and thus the load current at this time is returned by connecting the diodes D11 to D16 in reverse-parallel to the IGBTs 11 to 16, respectively.

Connection relationships among the constituent elements will be described next. An anode of the diode D1 is connected to an output end a1 of an AC source A0 and a cathode of the diode D2. An anode of the diode D3 is connected to an output end a2 of the AC source A0 and a cathode of the diode D4. An anode of the diode D5 is connected to an output end a3 of the AC source A0 and a cathode of the diode D6.

Meanwhile, cathodes of the diodes D1, D3, and D5, one end of the capacitor C1, collectors of the IGBTs 11, 13, and 15, and cathodes of the diodes D11, D13, and D15 are connected by the bus L1 to a P terminal.

Furthermore, anodes of the diodes D2, D4, and D6, another end of the capacitor C1, emitters of the IGBTs 12, 14, and 16, and anodes of the diodes D12, D14, and D16 are connected by the bus L2 to an N terminal.

Meanwhile, an emitter of the IGBT 11 is connected to an anode of the diode D11, a collector of the IGBT 12, a cathode of the diode D12, and the output terminal OUT1. The output terminal OUT1 is connected to the load M by the main line La.

An emitter of the IGBT 13 is connected to an anode of the diode D13, a collector of the IGBT 14, a cathode of the diode D14, and the output terminal OUT2. The output terminal OUT2 is connected to the load M by the main line Lb. Meanwhile, a current transformer CT1b is inserted into the main line Lb between the output terminal OUT2 and the load M.

An emitter of the IGBT 15 is connected to an anode of the diode D15, a collector of the IGBT 16, a cathode of the diode D16, and the output terminal OUT3. The output terminal OUT3 is connected to the load M by the main line Lc. Meanwhile, a current transformer CT1c is inserted into the main line Lc between the output terminal OUT3 and the load M.

The current transformers CT1b and CT1c are connected to the controller 40. Drive control signals s1 to s6 from the controller 40 are connected to input terminals of the driver circuits 31 to 36, respectively. Output terminals of the driver circuits 31 to 36 are connected to bases of the IGBTs 11 to 16, respectively.

Here, the controller 40 generates the drive control signals s1 to s6. The drive control signals s1 to s6 are pulse signals (Pulse Width Modulation (PWM) signals) that repeatedly alternate between H level and L level, and pulsewidths thereof are determined on the basis of received current information.

The drive control signals s1 to s6 sent from the controller 40 are inputted into the driver circuits 31 to 36, respectively, and switching of the IGBTs 11 to 16 is controlled by the driver circuits 31 to 36 driving the gates thereof.

In the switching control, for example, in the case where a gate driving level outputted from the driver circuit 31 is H level, a gate voltage is applied to the IGBT 11, and the IGBT 11 turns on and enters a conductive state as a result. Meanwhile, in the case where the gate driving level outputted from the driver circuit 31 is L level, the IGBT 11 turns off and enters a non-conductive state as a result. The same switching control is carried out for the IGBTs 12 to 16 as well.

Figure 3:
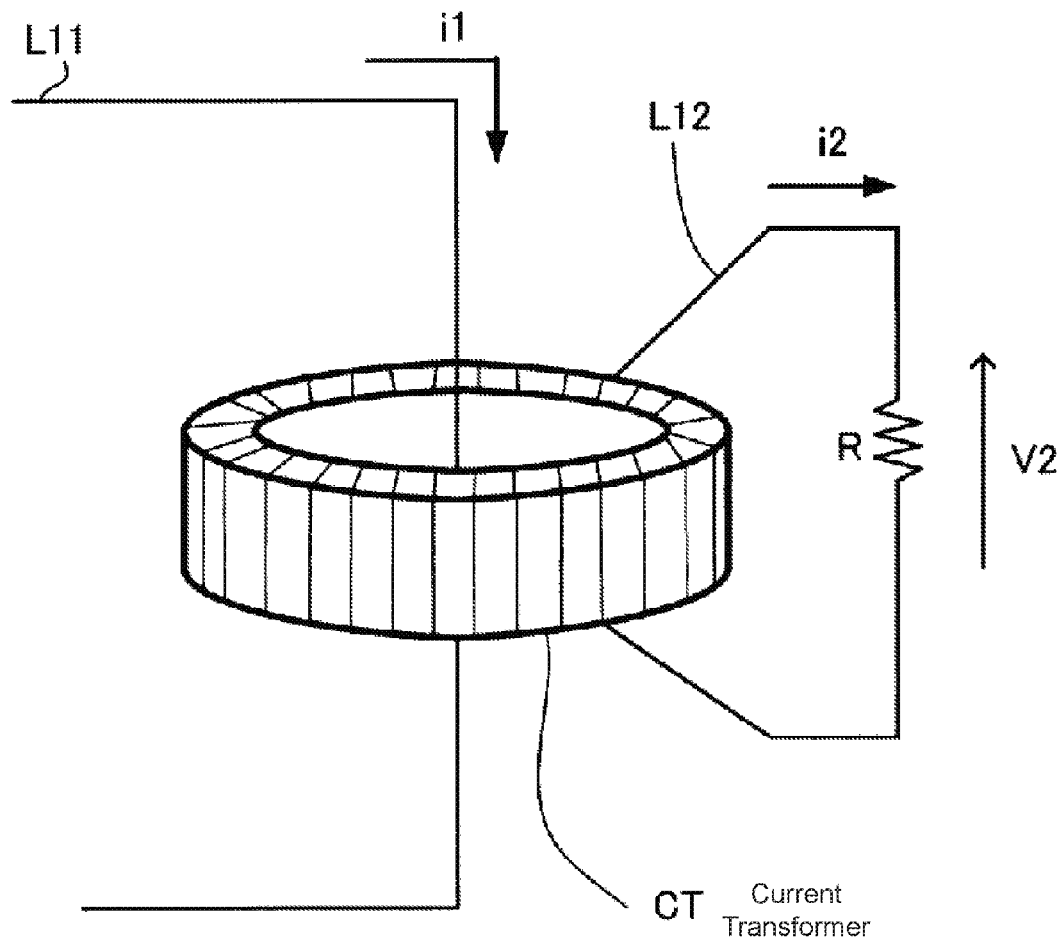
FIG. 3 is a diagram illustrating a current transformer.

Current detection by the current transformer will be described next. FIG. 3 is a diagram illustrating a current transformer. A current transformer CT is a hollow coil in which an electric line is wrapped around a core material made from a ferromagnetic body.

When a line L11 in which current flows is passed through a hole of the current transformer CT, current can be obtained from a line L12 connected to the current transformer CT at a winding number ratio of 1:n. For example, if a current i1 flows in the line L11, a current i2 flowing in the line L12 will be i2=i1/n. Additionally, if a resistor R is connected to the line L12 and the resistor R is taken as a load, a voltage V2 in proportion to the current i1 (=i1·R/n) can be obtained.

In this manner, information of the current detected by the current transformer CT is fed back to the controller 40. On the basis of this current information, the controller 40 outputs the drive control signals s1 to s6 for controlling the IGBTs 11 to 16 on and off.

Issues to be solved will be described next. As illustrated in FIG. 2, with the IPM 110, the current transformer CT1b is inserted into the main line Lb and the current transformer CT1c is inserted into the main line Lc, and a load current (output current) is detected.

Note that if the load currents flowing in two of the three main lines La, Lb, and Lc are known, the load current flowing in the remaining main line can be found through calculations, and it is for this reason that the current transformers CT1b and CT1c are inserted into the main lines Lb and Lc in the IPM 110 illustrated in FIG. 2.

In this manner, the conventional IPM 110 is configured such that the load currents flowing in the main lines are detected by current transformers, which makes it necessary for the IPM 110 to handle thick main lines or a wide bus bar attached to the main lines. This results in an increase in the sizes of the current transformers and an increase in the space needed to dispose the current transformers, and thus it has been difficult to reduce the size of the device.

Additionally, the greater the current rating of the IPM 110, the more the widths of the main lines will increase. This increases the diameter of the holes in the current transformers, which in turn increases the sizes of the current transformers.

Furthermore, it is desirable that parasitic inductance and parasitic impedance be reduced in order to realize lower noise, lower loss, and so on in the IPM 110. In this case, the main lines, the bus bar, and so on are made wider and shorter, but making these elements wider also increases the sizes of the current transformers. There is thus a problem in that if an attempt is made to reduce the size it becomes difficult to reduce the parasitic elements.

Meanwhile, according to the above-described Patent Document 1 (Japanese Patent Application Laid-Open Publication No. 2012-90499), the semiconductor device is divided into a main region and a sense region (a current detection region). Current is detected by obtaining current flowing in the sense region as detection current (sense current) and using a sense resistor to transform the current into a voltage signal.

However, insulation is a problem when sending a current signal detected using the configuration according to Patent Document 1 (that is, current information transformed into a voltage signal by the sense resistor) to a host controller. For safety reasons, sufficient insulation is required between the host controller and the IPM. Thus components such as an insulation amplifier for transmitting the current information, as well as an A/D converter, a digital isolator, and the like for transmitting the current information as a digital signal, are necessary.

Here, insulation amplifiers capable of transmitting signals with a high level of precision are expensive, and lead to an increase in costs. Furthermore, the number of components will increase both in the case where an insulation amplifier is used, and in the case where a configuration that transmits using digital values.

Having been achieved in light of such circumstances, the present invention provides a current detection device and a semiconductor device that solve the above-described conventional issues with current detection, and achieve a reduction in the scales of the devices.

Figure 4:
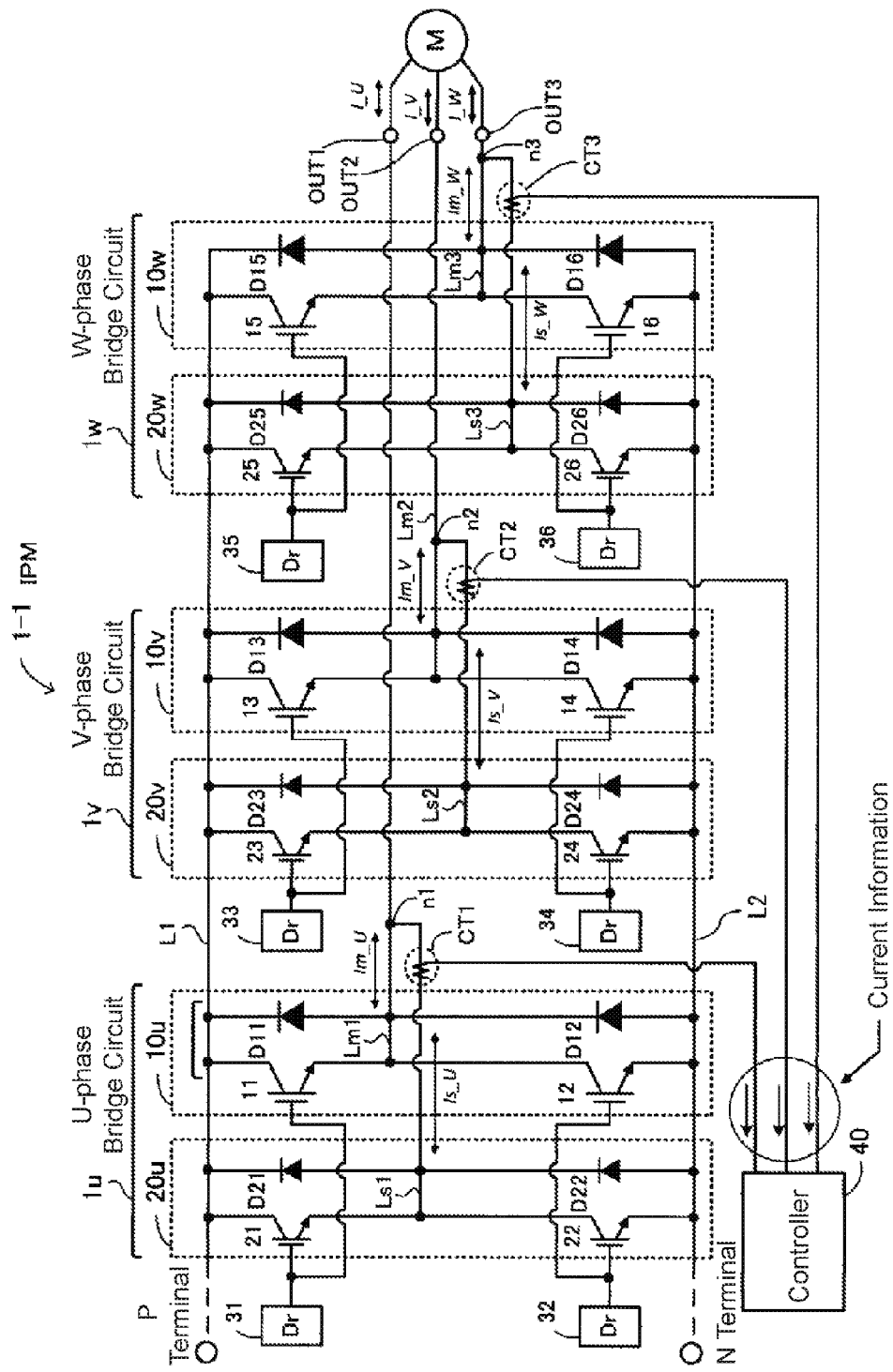
FIG. 4 is a diagram illustrating an example of the configuration of an IPM.

A configuration and operations in the case where the current detection device 1 according to the present invention is applied in an IPM semiconductor device will be described next. FIG. 4 is a diagram illustrating an example of the configuration of the IPM. Note that in FIG. 4, a rectifying bridge circuit that takes an AC voltage from an AC source (corresponding to the diodes D1 to D6 illustrated in FIG. 2) and a smoothing capacitor (corresponding to the capacitor C1 illustrated in FIG. 2).

An IPM 1-1 corresponding to the semiconductor device according to the present invention includes main bridge circuits 10u, 10v, and 10w, current detection bridge circuits 20u, 20v, and 20w, current transformers CT1 to CT3, and driver circuits 31 to 36. In the same manner as the configuration illustrated in FIG. 2, the IPM 1-1 operates a load M connected to output terminals OUT1 to OUT3 on the basis of switching control implemented by a host controller 40.

For a U phase, the main bridge circuit 10u (a U-phase main bridge circuit) and the current detection bridge circuit 20u (a U-phase current detection bridge circuit) are disposed as a U-phase bridge circuit 1u.

The main bridge circuit 10u includes IGBTs 11 and 12 and diodes D1l and D12 as first U-phase semiconductor devices. The current detection bridge circuit 20u includes IGBTs 21 and 22 and diodes D21 and D22 as second U-phase semiconductor devices.

For a V phase, the main bridge circuit 10v (a V-phase main bridge circuit) and the current detection bridge circuit 20v (a V-phase current detection bridge circuit) are disposed as a V-phase bridge circuit 1v.

The main bridge circuit 10v includes IGBTs 13 and 14 and diodes D13 and D14 as first V-phase semiconductor devices. The current detection bridge circuit 20v includes IGBTs 23 and 24 and diodes D23 and D24 as second V-phase semiconductor devices.

For a W phase, the main bridge circuit 10w (a W-phase main bridge circuit) and the current detection bridge circuit 20w (a W-phase current detection bridge circuit) are disposed as a W-phase bridge circuit 1w.

The main bridge circuit 10w includes IGBTs 15 and 16 and diodes D15 and D16 as first W-phase semiconductor devices. The current detection bridge circuit 20w includes IGBTs 25 and 26 and diodes D25 and D26 as second W-phase semiconductor devices.

Note that Si (silicon), SiC (silicon carbide), or the like is used as the material of the IGBTs 11 to 16 and 21 to 26 in FIG. 4. The diodes D11 to D16 and D21 to D26, meanwhile, are constituted of Si-FWDs or Schottky barrier diodes (SiC-SBDs). Additionally, although IGBTs are used as the semiconductor switches in FIG. 4, Metal Oxide Semiconductor Field Effect Transistors (MOSFETs) may be used instead.

Here, the main bridge circuit 10u outputs a main current Im_U (a first U-phase current) through an output line Lm1 (a first U-phase output line) connected to the load M. The current detection bridge circuit 20u is connected in parallel to the main bridge circuit 10u, and outputs a sense current Is_U (a second U-phase current) through an output line Ls1 (a second U-phase output line) connected at one end to the output line Lm1.

The main bridge circuit 10v outputs a main current Im_V (a first V-phase current) through an output line Lm2 (a first V-phase output line) connected to the load M. The current detection bridge circuit 20v is connected in parallel to the main bridge circuit 10v, and outputs a sense current Is_V (a second V-phase current) through an output line Ls2 (a second V-phase output line) connected at one end to the output line Lm2.

The main bridge circuit 10w outputs a main current Im_W (a first W-phase current) through an output line Lm3 (a first W-phase output line) connected to the load M. The current detection bridge circuit 20w is connected in parallel to the main bridge circuit 10w, and outputs a sense current Is_W (a second W-phase current) through an output line Ls3 (a second W-phase output line) connected at one end to the output line Lm3.

The current transformer CT1 (a U-phase current detection unit), which is a first current transformer, is disposed in the output line Ls1 and detects the sense current Is_U. The current transformer CT2 (a V-phase current detection unit), which is a second current transformer, is disposed in the output line Ls2 and detects the sense current Is_V.

The current transformer CT3 (a W-phase current detection unit), which is a third current transformer, is disposed in the output line Ls3 and detects the sense current Is_W. The flow of current is indicated by double-ended arrows in FIG. 4, and this is to indicate the flow of current from the bridge circuits to the load M and the return of current from the load M to the bridge circuits.

Connection relationships among the constituent elements will be described next. Collectors of the IGBTs 11, 13, 15, 21, 23, and 25 and cathodes of the diodes D11, D13, D15, D21, D23, and D25 are connected by a bus L1 to a P terminal.

Emitters of the IGBTs 12, 14, 16, 22, 24, and 26 and anodes of the diodes D12, D14, D16, D22, D24, and D26 are connected by the bus L2 to an N terminal.

An emitter of the IGBT 21, an anode of the diode D21, a collector of the IGBT 22, and a cathode of the diode D22 are connected by the output line Ls1 of the current detection bridge circuit 20u.

An emitter of the IGBT 11, an anode of the diode D11, a collector of the IGBT 12, a cathode of the diode D12, and the output terminal OUT1 are connected by the output line Lm1 of the main bridge circuit 10u. The current transformer CT1 is inserted into the output line Ls1, and the output line Ls1 and output line Lm1 are connected by a node n1.

Meanwhile, an emitter of the IGBT 23, an anode of the diode D23, a collector of the IGBT 24, and a cathode of the diode D24 are connected by the output line Ls2 of the current detection bridge circuit 20v.

An emitter of the IGBT 13, an anode of the diode D13, a collector of the IGBT 14, a cathode of the diode D14, and the output terminal OUT2 are connected by the output line Lm2 of the main bridge circuit 10v. The current transformer CT2 is inserted into the output line Ls2, and the output line Ls2 and output line Lm2 are connected by a node n2.

Furthermore, an emitter of the IGBT 25, an anode of the diode D25, a collector of the IGBT 26, and a cathode of the diode D26 are connected by the output line Ls3 of the current detection bridge circuit 20w.

An emitter of the IGBT 15, an anode of the diode D15, a collector of the IGBT 16, a cathode of the diode D16, and the output terminal OUT3 are connected by the output line Lm3 of the main bridge circuit 10w. The current transformer CT3 is inserted into the output line Ls3, and the output line Ls3 and output line Lm3 are connected by a node n3.

The current detection lines of the current transformers CT1 to CT3 are connected to the controller 40. An output terminal of the driver circuit 31 is connected to bases of the IGBTs 11 and 21, and an output terminal of the driver circuit 32 is connected to bases of the IGBTs 12 and 22.

An output terminal of the driver circuit 33 is connected to bases of the IGBTs 13 and 23, and an output terminal of the driver circuit 34 is connected to bases of the IGBTs 14 and 24. An output terminal of the driver circuit 35 is connected to bases of the IGBTs 15 and 25, and an output terminal of the driver circuit 36 is connected to bases of the IGBTs 16 and 26.

Here, on the basis of the information of currents detected by the current transformers CT1 to CT3, the controller 40 generates driving control signals (not illustrated) for controlling switching of the transistors and sends the generated signals to the driver circuits 31 to 36, respectively.

The driving of the IGBT 11 within the main bridge circuit 10u (a first U-phase high-side transistor) and the driving of the IGBT 21 of the current detection bridge circuit 20u (a second U-phase high-side transistor) are controlled by the same driver circuit 31 (a U-phase high-side driver circuit).

The driving of the IGBT 12 within the main bridge circuit 10u (a first U-phase low-side transistor) and the driving of the IGBT 22 of the current detection bridge circuit 20u (a second U-phase low-side transistor) are controlled by the same driver circuit 32 (a U-phase low-side driver circuit).

Meanwhile, the driving of the IGBT 13 within the main bridge circuit 10v (a first V-phase high-side transistor) and the driving of the IGBT 23 of the current detection bridge circuit 20v (a second V-phase high-side transistor) are controlled by the same driver circuit 33 (a V-phase high-side driver circuit).

Additionally, the driving of the IGBT 14 within the main bridge circuit 10v (a first V-phase low-side transistor) and the driving of the IGBT 24 of the current detection bridge circuit 20v (a second V-phase low-side transistor) are controlled by the same driver circuit 34 (a V-phase low-side driver circuit).

Furthermore, the driving of the IGBT 15 within the main bridge circuit 10w (a first W-phase high-side transistor) and the driving of the IGBT 25 of the current detection bridge circuit 20w (a second W-phase high-side transistor) are controlled by the same driver circuit 35 (a W-phase high-side driver circuit).

Additionally, the driving of the IGBT 16 within the main bridge circuit 10w (a first W-phase low-side transistor) and the driving of the IGBT 26 of the current detection bridge circuit 20w (a second W-phase low-side transistor) are controlled by the same driver circuit 36 (a W-phase low-side driver circuit).

As described above, the IPM 1-1 has a configuration in which in each phase, a current detection bridge circuit constituted of current detection IGBTs and diodes (FWDs) and a main bridge circuit constituted of main IGBTs and diode (FWDs) are connected in parallel.

In other words, in the U phase, the current detection bridge circuit 20u including the IGBTs 21 and 22 and the diodes D21 and D22, and the main bridge circuit 10u including the main IGBTs 11 and 12 and the diodes D11 and D12, are connected in parallel.

In the V phase, the current detection bridge circuit 20v including the IGBTs 23 and 24 and the diodes D23 and D24, and the main bridge circuit 10v including the main IGBTs 13 and 14 and the diodes D13 and D14, are connected in parallel.

In the W phase, the current detection bridge circuit 20w including the IGBTs 25 and 26 and the diodes D25 and D26, and the main bridge circuit 10w including the main IGBTs 15 and 16 and the diodes D15 and D16, are connected in parallel.

Additionally, the current transformer CT1 is inserted into the output line Ls1 of the current detection bridge circuit 20u, and the current transformer CT1 detects the sense current Is_U flowing in the current detection bridge circuit 20u.

Likewise, the current transformer CT2 is inserted into the output line Ls2 of the current detection bridge circuit 20v, and the current transformer CT2 detects the sense current Is_V flowing in the current detection bridge circuit 20v.

Furthermore, the current transformer CT3 is inserted into the output line Ls3 of the current detection bridge circuit 20w, and the current transformer CT3 detects the sense current Is_W flowing in the current detection bridge circuit 20w.

On the other hand, the output lines of the current detection bridge circuits in each phase are connected to the output lines of the main bridge circuits into which the current transformers have been inserted. In other words, the output line Ls1 of the U-phase current detection bridge circuit 20u is connected to the output line Lm1 of the main bridge circuit 10u at the node n1 located beyond where the current transformer CT1 is inserted.

Additionally, the output line Ls2 of the V-phase current detection bridge circuit 20v is connected to the output line Lm2 of the main bridge circuit 10v at the node n2 located beyond where the current transformer CT2 is inserted.

Furthermore, the output line Ls3 of the W-phase current detection bridge circuit 20w is connected to the output line Lm3 of the main bridge circuit 10w at the node n3 located beyond where the current transformer CT3 is inserted.

As such, in the U phase, the sense current Is_U flowing in the current detection bridge circuit 20u is added to the main current Im_U flowing in the main bridge circuit 10u, and thus a load current I_U outputted from the output terminal OUT1 is I_U=Im_U+Is_U.

Likewise, in the V phase, the sense current Is_V flowing in the current detection bridge circuit 20v is added to the main current Im_V flowing in the main bridge circuit 10v, and thus a load current I_V outputted from the output terminal OUT2 is I_V=Im_V+Is_V.

Furthermore, in the W phase, the sense current Is_W flowing in the current detection bridge circuit 20w is added to the main current Im_W flowing in the main bridge circuit 10w, and thus a load current I_W outputted from the output terminal OUT3 is I_W=Im_W+Is_W.

Next, a ratio between the main current Im and the sense current Is will be described. As described above, the IPM 1-1 is configured such that the load current outputted from a single output terminal is divided into a main current and a sense current flowing in two current paths, namely the output line of the main bridge circuit and the output line of the current detection bridge circuit, and the sense current is detected by the current transformer.

In this case, a current ratio between the sense current flowing in the output line of the current detection bridge circuit and the main current flowing in the output line of the main bridge circuit is the same as a surface area ratio between a chip surface area of the semiconductor devices in the current detection bridge circuit and a chip surface area of the semiconductor devices in the main bridge circuit. Note that the surface area referred to here is, for example, an active surface area of the semiconductor devices (a surface area of active layers).

Figure 5:
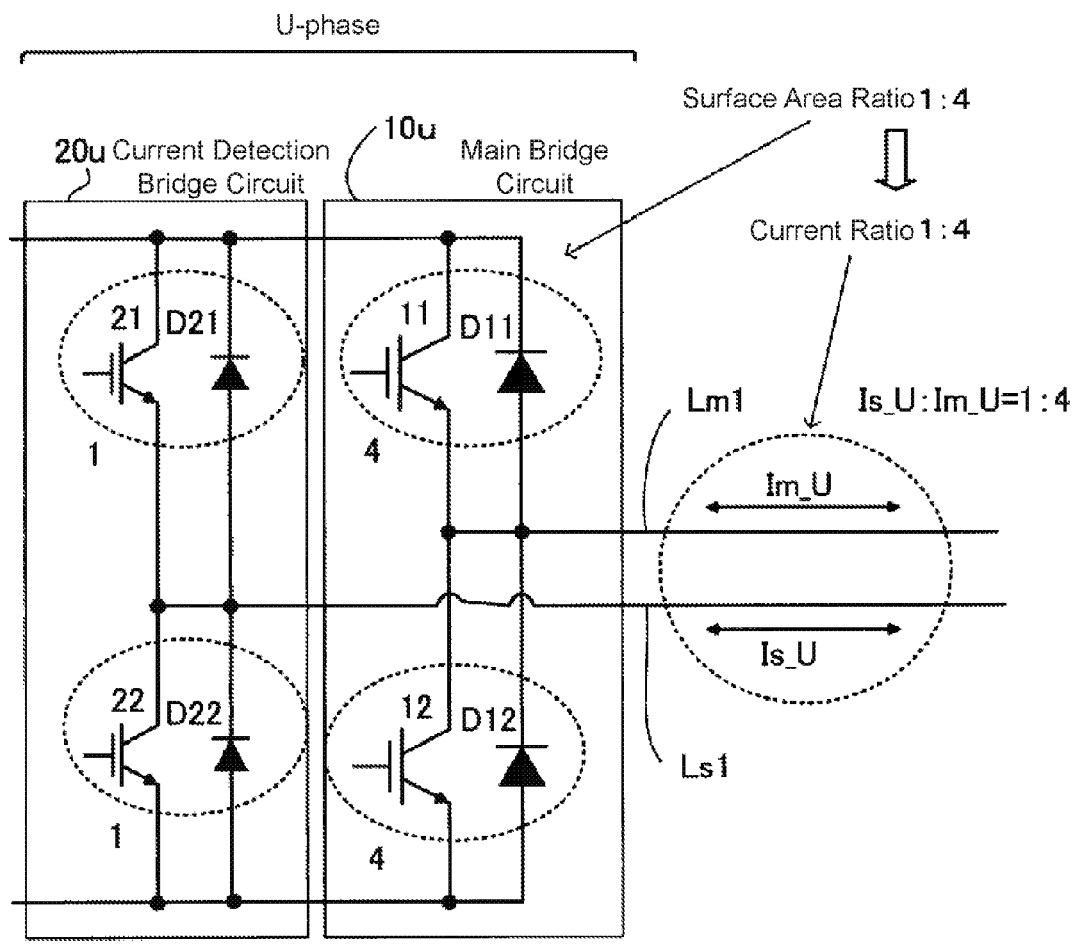
FIG. 5 is a diagram illustrating a correspondence relationship between a surface area ratio and a current ratio.
Figure 6:
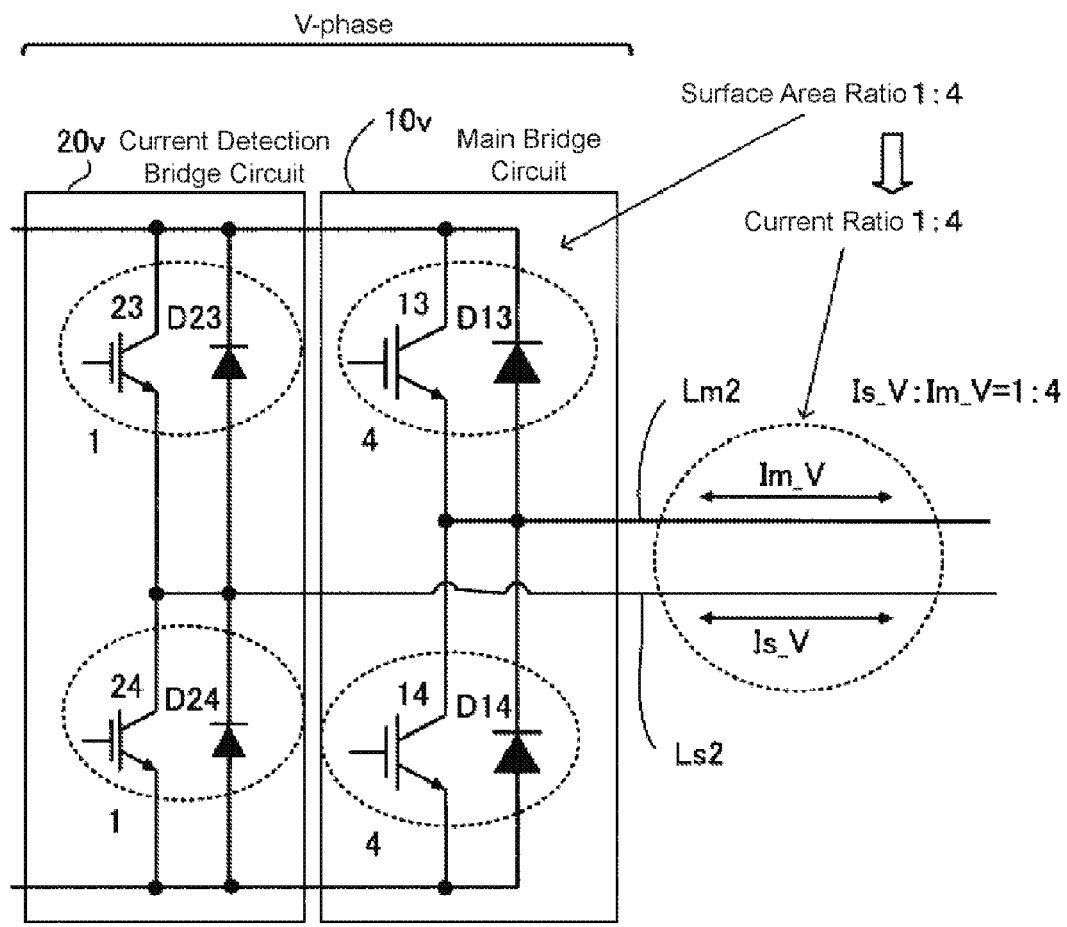
FIG. 6 is a diagram illustrating a correspondence relationship between a surface area ratio and a current ratio.
Figure 7:
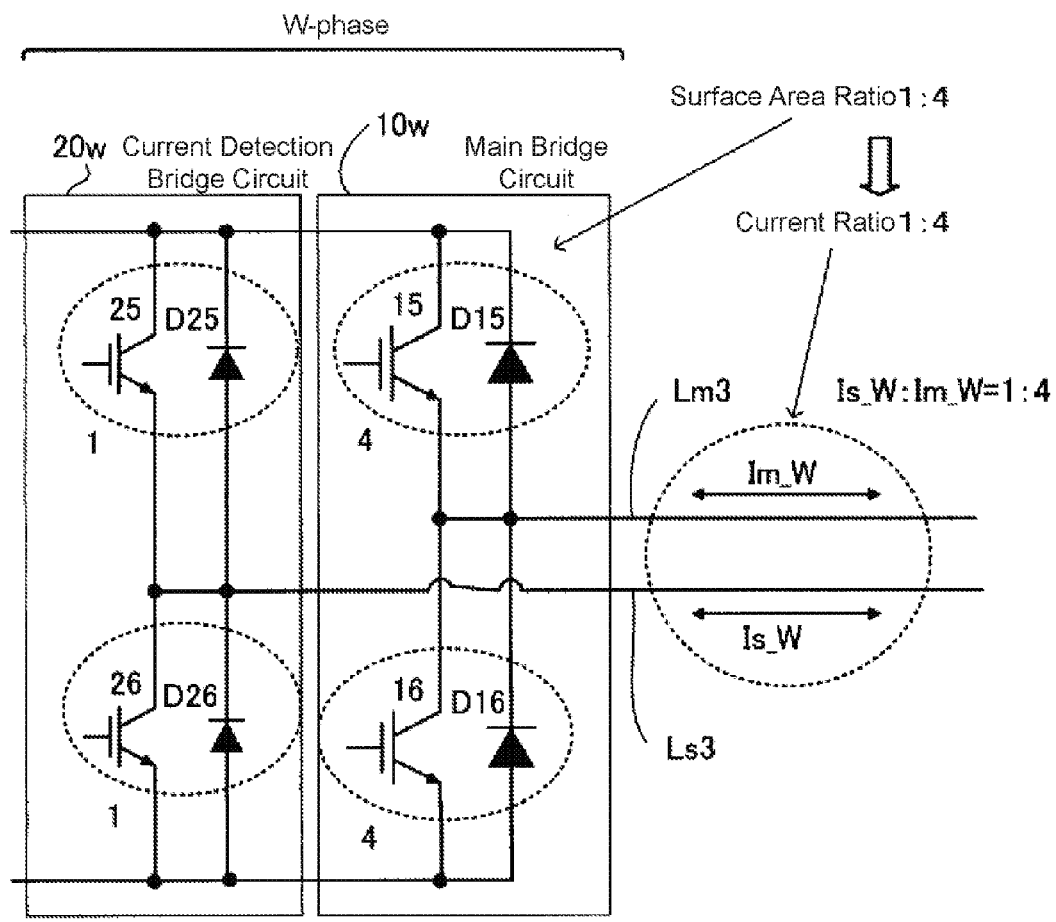
FIG. 7 is a diagram illustrating a correspondence relationship between a surface area ratio and a current ratio.

FIGS. 5 to 7 are diagrams illustrating correspondence relationships between the surface area ratio and the current ratio. In the U phase illustrated in FIG. 5, a surface area ratio between a surface area of the IGBTs 21 and 22 and the diodes D21 and D22 of the current detection bridge circuit 20u (a second U-phase active surface area) and a surface area of the IGBTs 11 and 12 and the diodes D11 and D12 of the main bridge circuit 10u (a first U-phase active surface area) is 1:4, for example.

Because the surface area ratio and the current ratio are equal, the current ratio between the sense current Is_U outputted from the current detection bridge circuit 20u and flowing in the output line Ls1, and the main current Im_U outputted from the main bridge circuit 10u and flowing in the output line Lm1, is also 1:4.

Accordingly, the sense current Is_U in the U phase is ⅕ the total load current I_U in the U phase. In other words, Is_U=I_U/(1+4). Therefore, because the surface area ratio is determined at the design stage and is known, the U-phase load current I_U can be found by multiplying the current value detected by the current transformer CT1 inserted into the output line Ls1 of the current detection bridge circuit 20u by 5.

Likewise, in the V phase illustrated in FIG. 6, a surface area ratio between a surface area of the IGBTs 23 and 24 and the diodes D23 and D24 of the current detection bridge circuit 20v (a second V-phase active surface area) and a surface area of the IGBTs 13 and 14 and the diodes D13 and D14 of the main bridge circuit 10v (a first V-phase active surface area) is 1:4, for example.

Because the surface area ratio and the current ratio are equal, the current ratio between the sense current Is_V outputted from the current detection bridge circuit 20v and flowing in the output line Ls2, and the main current Im_V outputted from the main bridge circuit 10v and flowing in the output line Lm2, is also 1:4.

Accordingly, the sense current Is_V in the V phase is ⅕ the total load current I_V in the V phase. In other words, Is_V=I_V/(1+4). Therefore, because the surface area ratio is determined at the design stage and is known, the V-phase load current I_V can be found by multiplying the current value detected by the current transformer CT2 inserted into the output line Ls2 of the current detection bridge circuit 20v by 5.

Likewise, in the W phase illustrated in FIG. 7, a surface area ratio between a surface area of the IGBTs 25 and 26 and the diodes D25 and D26 of the current detection bridge circuit 20w (a second W-phase active surface area) and a surface area of the IGBTs 15 and 16 and the diodes D15 and D16 of the main bridge circuit 10w (a first W-phase active surface area) is 1:4, for example.

Because the surface area ratio and the current ratio are equal, the current ratio between the sense current Is_W outputted from the current detection bridge circuit 20w and flowing in the output line Ls3, and the main current Im_W outputted from the main bridge circuit 10w and flowing in the output line Lm3, is also 1:4.

Accordingly, the sense current Is_W in the W phase is ⅕ the total load current I_W in the W phase. In other words, Is_W=I_W/(1+4). Therefore, because the surface area ratio is determined at the design stage and is known, the W-phase load current I_W can be found by multiplying the current value detected by the current transformer CT3 inserted into the output line Ls3 of the current detection bridge circuit 20w by 5.

To generalize the details described above, the surface area ratio between the surface area of the semiconductor devices in the current detection bridge circuit and the surface area of the semiconductor devices in the main bridge circuit is s:m. In this case, the current ratio between the sense current outputted from the current detection bridge circuit and the main current outputted from the main bridge circuit is s:m as well. Accordingly, a relational expression between the sense current Is and a total load current I is Is=I·s/(s+m).

In this manner, the sense current flowing in the current detection bridge circuit and the main current flowing in the main bridge circuit are determined by the chip surface area ratio between the IGBTs and FWDs within the current detection bridge circuit and the IGBTs and FWDs within the main bridge circuit. Thus the total load current can be found by detecting the sense current using the current transformers and factoring in the surface area ratio of the semiconductor devices.

Additionally, in this case, the chip surface area of the IGBTs and FWDs within the current detection bridge circuit is smaller than the chip surface area of the IGBTs and FWDs within the main bridge circuit. As a result, the sense current flowing in the current detection bridge circuit becomes lower than the main current flowing in the main bridge circuit (sense current Is<main current Im). This makes it possible to employ small current transformers, which in turn makes it possible to reduce the scale of the device.

For example, in the case where the IPM has a current rating of 300 A, an IPM in which a current transformer is inserted into the main line as illustrated in FIG. 2 will require no less than 300 A as an input current range of the current transformer used therein, resulting in an increase in size.

As opposed to this, with the IPM 1-1 illustrated in FIG. 4, the sense current flowing in the current detection bridge circuit connected in parallel to the main bridge circuit is detected. As such, in this example, a current transformer having an input current range of no less than ⅕ the current rating, namely 60 A, can be used. This makes it possible to use a small-size current transformer.

Conventionally, the current information obtained by detecting the load current flowing in the main line is received by the controller, whereupon the controller generates the driving control signals to carry out switching control. As opposed to this, according to the present invention, the current information of the current flowing in the current detection bridge circuit is received by the controller, but as described above, the total load current can easily be calculated from the received current information. Thus no impediments to the switching control will arise.

Additionally, according to the IPM 1-1 illustrated in FIG. 4, current detection is carried out for all three phases, namely U, V, and W, using the three current transformers CT1 to CT3. The information of the detected currents is obtained for each of the phases using the information of the detected currents so that, for example, the controller can carry out protection control for overvoltage and the like in each phase.

Thus in the case where the state of each phase is obtained from the current information, the current is detected for all of the three phases, namely U, V, and W (if the function is only for finding the load current, the configuration may be such that the current is detected for only two of the three phases).

Figure 8:
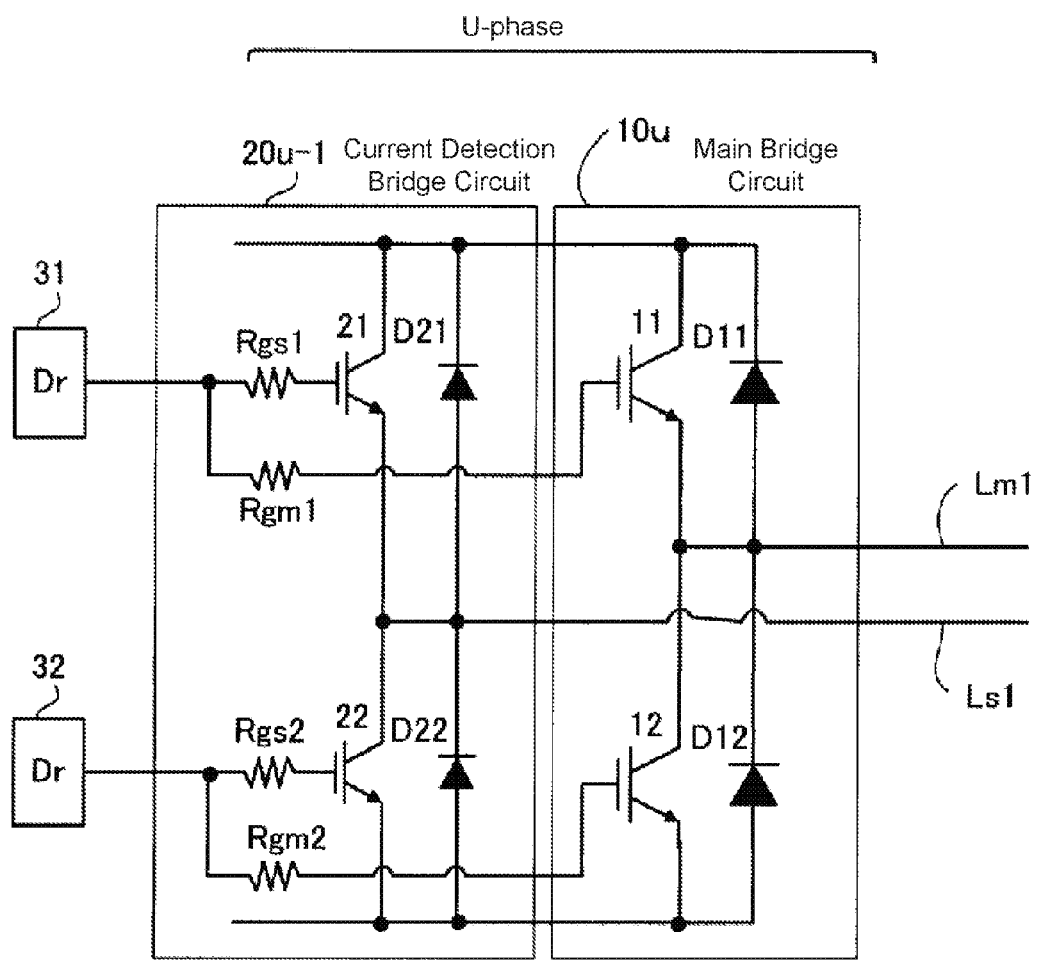
FIG. 8 is a diagram illustrating the configuration of a variation on a current detection bridge circuit.

Variations on the current detection bridge circuit will be described next. FIG. 8 is a diagram illustrating the configuration of a variation on the current detection bridge circuit. A current detection bridge circuit 20u-1 according to this variation has resistors Rgs1 and Rgm1 and resistors Rgs2 and Rgm2 as new elements.

One end of the resistor Rgs1 is connected to a gate of the IGBT 21, and another end of the resistor Rgs1 is connected to an output end of the driver circuit 31 and one end of the resistor Rgm1. Another end of the resistor Rgm1 is connected to a gate of the IGBT 11.

One end of the resistor Rgs2 is connected to a gate of the IGBT 22, and another end of the resistor Rgs2 is connected to an output end of the driver circuit 32 and one end of the resistor Rgm2. Another end of the resistor Rgm2 is connected to a gate of the IGBT 12.

The stated resistors Rgs1 and Rgm1 and resistors Rgs2 and Rgm2 are gate resistors for timing adjustment. Providing such resistors makes it possible to eliminate gate timing differences. In other words, providing the resistors Rgs1 and Rgm1 reduces a gate driving timing difference for the IGBT 11 and the IGBT 21. Likewise, providing the resistors Rgs2 and Rgm2 reduces a gate driving timing difference for the IGBT 12 and the IGBT 22.

Furthermore, providing the resistors Rgs1 and Rgm1 and the resistors Rgs2 and Rgm2 makes it possible to avoid a situation where current concentrates in the diodes. Although FIG. 8 only illustrates the configuration of the variation on the U-phase current detection bridge circuit, the configuration is the same for the V- and W-phase current detection bridge circuits as well.

Effects of the present invention will be described next, including points of difference from the conventional technique. Rather than detection a main current flowing in a main line using a current transformer as with the conventional IPM 110 illustrated in FIG. 2, the IPM 1-1 according to the technique of the present invention illustrated in FIG. 4 is configured such that the bridge circuits are divided into main bridge circuits and current detection bridge circuits, and currents flowing in the current detection bridge circuits are detected by current transformers.

The sense current flowing in the current detection bridge circuit is determined by a surface area ratio between the active surface area of the semiconductor devices constituting the current detection bridge circuit and the active surface area of the semiconductor devices constituting the main bridge circuit.

Accordingly, if the design is such that the active surface area ratio is a ratio of approximately 1:several thousand, for example, the sense current can be brought to a small current on the order of 1/several thousand, compared to the main current. Accordingly, the sense current detected by the current transformer is much smaller than the main current, which makes it possible to use small current transformers. This in turn makes it possible to reduce the scale and costs of the device.

Additionally, reducing the size of the current transformers makes integration into the IPM possible. In this case, no current transformer is inserted into the main line located between the output terminal of the IPM and the load, and thus a compact product form can be achieved. Furthermore, as an advantage for IPM developers, the current detection circuit can be integrated into a module, which makes designing a current detection circuit unnecessary. This can contribute to a reduction in the product design lead time.

Furthermore, integrating the current transformers into the IPM makes it possible to make the main line, the bus bar, and so on short and thick, which in turn makes it easy to reduce parasitic elements.

On the other hand, according to the above-described Patent Document 1, the semiconductor device is divided into a main region and a sense region (a current detection region), and current is detected by transforming current flowing in the sense region into a voltage signal using a sense resistor.

As opposed to this, according to the present invention, bridge circuits in which the main bridge circuits and the current detection bridge circuits are connected in parallel are provided, and the configuration is such that currents flowing in the current detection bridge circuits are detected using current transformers rather than sense resistors.

Additionally, the current transformer is a hollow coil in which an electric line is wrapped around a core material made from a ferromagnetic body, as illustrated in FIG. 3, and is a device in which the current transformer itself is insulated.

Although Patent Document 1 requires a new component for insulation, the present invention uses current transformers and thus does not require insulating devices for signal transmission. Accordingly, increases in the number of components and costs can be suppressed.

Furthermore, according to Patent Document 1, an emitter terminal is split between use for a main region and a sense region to obtain current, and thus a current detection circuit is provided for each semiconductor device. As opposed to this, the configuration of the present invention is such that the bridge circuit itself is divided into a main bridge circuit and a current detection bridge circuit, and a current transformer is inserted into the output line of that current detection bridge circuit.

Thus comparing the three-phase full bridge circuit, while Patent Document 1 requires a maximum of six current detection circuits, the present invention only requires three current detection units (three current transformers), which makes it possible to achieve further miniaturization.

While embodiments have been described thus far as examples, the configurations of the elements described in the embodiments can be replaced with other elements having equivalent functions. Other desired configurations, processes, and so on may be added as well.

It will be apparent to those skilled in the art that various modifications and variations can be made in the present invention without departing from the spirit or scope of the invention. Thus, it is intended that the present invention cover modifications and variations that come within the scope of the appended claims and their equivalents. In particular, it is explicitly contemplated that any part or whole of any two or more of the embodiments and their modifications described above can be combined and regarded within the scope of the present invention.

What is claimed is:

1. A three-phase semiconductor inverter circuit having a current detection circuitry, comprising:
a pair of DC input nodes configured to receive a DC voltage;
a U-phase main bridge circuit connected between the pair of DC input nodes, the U-phase main bridge circuit converting the received DC voltage to a primary U-phase AC current so as to output the primary U-phase AC current through a U-phase output terminal to be connected to a load;
a U-phase supplementary bridge circuit connected in parallel to the U-phase main bridge circuit between the pair of DC input nodes for calculating an amount of the U-phase AC current outputted by the U-phase main bridge circuit, the U-phase supplementary bridge circuit having a circuit configuration identical to that of the U-phase main bridge circuit with smaller circuit parameters in at least some of constituent circuit elements so as to generate a detection-use U-phase AC current that is a prescribed fraction of said U-phase AC current outputted by the U-phase main bridge circuit, an output line of the U-phase supplementary bridge circuit carrying the detection-use U-phase AC current being connected to the U-phase output terminal of the U-phase main bridge circuit to supplement the primary U-phase AC current;
a U-phase current detector disposed on said U-phase output line of the U-phase supplementary bridge circuit to detect the detection-use U-phase AC current and output a U-phase signal corresponding to the detected detection-use U-phase AC current that is said prescribed fraction of the primary U-phase AC current from the main bridge circuit;
a V-phase main bridge circuit connected between the pair of DC input nodes, the V-phase main bridge circuit converting the received DC voltage to a primary V-phase AC current so as to output the primary V-phase AC current through a V-phase output terminal to be connected to the load;
a V-phase supplementary bridge circuit connected in parallel to the V-phase main bridge circuit between the pair of DC input nodes for calculating an amount of the V-phase AC current outputted by the V-phase main bridge circuit, the V-phase supplementary bridge circuit having a circuit configuration identical to that of the V-phase main bridge circuit with smaller circuit parameters in at least some of constituent circuit elements so as to generate a detection-use V-phase AC current that is a prescribed fraction of said V-phase AC current outputted by the V-phase main bridge circuit, an output line of the V-phase supplementary bridge circuit carrying the detection-use V-phase AC current being connected to the V-phase output terminal of the V-phase main bridge circuit to supplement the primary V-phase AC current;
a V-phase current detector disposed on said V-phase output line of the V-phase supplementary bridge circuit to detect the detection-use V-phase AC current and output a V-phase signal corresponding to the detected detection-use V-phase AC current that is said prescribed fraction of the primary V-phase AC current from the main bridge circuit;
a W-phase main bridge circuit connected between the pair of DC input nodes, the W-phase main bridge circuit converting the received DC voltage to a primary W-phase AC current so as to output the primary W-phase AC current through a W-phase output terminal to be connected to the load;

a W-phase supplementary bridge circuit connected in parallel to the W-phase main bridge circuit between the pair of DC input nodes for calculating an amount of the W-phase AC current outputted by the W-phase main bridge circuit, the W-phase supplementary bridge circuit having a circuit configuration identical to that of the W-phase main bridge circuit with smaller circuit parameters in at least some of constituent circuit elements so as to generate a detection-use W-phase AC current that is a prescribed fraction of said W-phase AC current outputted by the W-phase main bridge circuit, an output line of the W-phase supplementary bridge circuit carrying the detection-use W-phase AC current being connected to the W-phase output terminal of the W-phase main bridge circuit to supplement the primary W-phase AC current; and a W-phase current detector disposed on said W-phase output line of the W-phase supplementary bridge circuit to detect the detection-use W-phase AC current and output a W-phase signal corresponding to the detected detection-use W-phase AC current that is said prescribed fraction of the primary W-phase AC current from the main bridge circuit.

2. The three-phase semiconductor inverter circuit according to claim 1,
wherein each of the U-phase, V-phase, and W-phase current detectors includes a current transformer.

3. The three-phase semiconductor inverter circuit according to claim 1,
wherein each of the U-phase, V-phase, and W-phase main bridge circuit includes a first semiconductor device, and each of the U-phase, V-phase, and W-phase supplementary bridge circuit includes a second semiconductor device, and
wherein in each pair of the U-phase, V-phase, and W-phase main and supplementary bridge circuits, an area ratio of an active surface area of the second semiconductor device to an active surface area of the first semiconductor device is set to a prescribed value that is greater than one so that the corresponding detection-use AC current is the corresponding prescribed fraction of the corresponding primary AC current.

4. The three-phase semiconductor inverter circuit according to claim 2, wherein said current transformers are integrated into the three-phase semiconductor inverter circuit.

5. The three-phase semiconductor inverter circuit according to claim 1, further comprising;
a U-phase high-side driver circuit;
a U-phase low-side driver circuit;
a V-phase high-side driver circuit;
a V-phase low-side driver circuit;
a W-phase high-side driver circuit; and
a W-phase low-side driver circuit;
wherein said U-phase main bridge circuit includes a first high-side transistor and a first low-side transistor connected in series between the DC input nodes,
wherein said U-phase supplementary bridge circuit includes a second high-side transistor and a second low-side transistor connected in series between the DC input nodes, and
wherein the first high-side transistor in the U-phase main bridge circuit and the second high-side transistor in the U-phase supplementary bridge circuit are both driven by a same driving signal outputted from said U-phase high-side driver circuit, and the first low-side transistor in the U-phase main bridge circuit and the second low-side transistor in the U-phase supplementary bridge circuit are both driven by a same driving signal outputted from said U-phase low-side driver circuit,
wherein said V-phase main bridge circuit includes a first high-side transistor and a first low-side transistor connected in series between the DC input nodes,
wherein said V-phase supplementary bridge circuit includes a second high-side transistor and a second low-side transistor connected in series between the DC input nodes, and
wherein the first high-side transistor in the V-phase main bridge circuit and the second high-side transistor in the V-phase supplementary bridge circuit are both driven by a same driving signal outputted from said V-phase high-side driver circuit, and the first low-side transistor in the V-phase main bridge circuit and the second low-side transistor in the V-phase supplementary bridge circuit are both driven by a same driving signal outputted from said V-phase low-side driver circuit,
wherein said W-phase main bridge circuit includes a first high-side transistor and a first low-side transistor connected in series between the DC input nodes,
wherein said W-phase supplementary bridge circuit includes a second high-side transistor and a second low-side transistor connected in series between the DC input nodes, and
wherein the first high-side transistor in the W-phase main bridge circuit and the second high-side transistor in the W-phase supplementary bridge circuit are both driven by a same driving signal outputted from said W-phase high-side driver circuit, and the first low-side transistor in the W-phase main bridge circuit and the second low-side transistor in the W-phase supplementary bridge circuit are both driven by a same driving signal outputted from said W-phase low-side driver circuit.

6. The three-phase semiconductor inverter circuit according to claim 5, further comprising a controller receiving the U-phase, V-phase, and W-phase signals from the U-phase, V-phase, and W-phase current detectors, respectively, and controlling the U-phase, V-phase, and W-phase high-side driver circuits and the U-phase, V-phase, and W-phase low-side driver circuits in accordance with the received U-phase, V-phase, and W-phase signals, respectively so as to regulate the U-phase, V-phase, and W-phase primary AC currents and the U-phase, V-phase, and W-phase detection-use AC currents.

* * * * *